United States Patent
Hanning et al.

(10) Patent No.: US 10,806,153 B2
(45) Date of Patent: Oct. 20, 2020

(54) SYSTEM AND METHOD FOR DETECTING WOODY BREAST CONDITION IN BROILERS USING IMAGE ANALYSIS OF CARCASS FEATURES

(71) Applicant: BOARD OF TRUSTEES OF THE UNIVERSITY OF ARKANSAS, Little Rock, AR (US)

(72) Inventors: Casey Owens Hanning, Springdale, AR (US); Xiao Sun, Nanjing (CN); Juan P. Caldas-Cueva, Lima (PE); Andronikos Mauromostakos, Fayetteville, AR (US)

(73) Assignee: Board of Trustees of the University of Arkansas, Little Rock, AR (US)

( * ) Notice: Subject to any disclaimer, the term of this patent is extended or adjusted under 35 U.S.C. 154(b) by 14 days.

(21) Appl. No.: 16/012,908

(22) Filed: Jun. 20, 2018

(65) Prior Publication Data
US 2018/0360054 A1   Dec. 20, 2018

Related U.S. Application Data

(60) Provisional application No. 62/522,332, filed on Jun. 20, 2017.

(51) Int. Cl.
*G06T 7/00* (2017.01)
*A22B 5/00* (2006.01)
*G06T 7/13* (2017.01)

(52) U.S. Cl.
CPC ............ *A22B 5/007* (2013.01); *G06T 7/0004* (2013.01); *G06T 7/13* (2017.01); *G06T 2207/30128* (2013.01)

(58) Field of Classification Search
CPC ......... A22B 5/007; G06T 7/13; G06T 7/0004; G06T 2207/30128
See application file for complete search history.

(56) References Cited

U.S. PATENT DOCUMENTS

| | | | |
|---|---|---|---|
| 2007/0111648 A1* | 5/2007 | Martel | A22B 5/007 452/118 |
| 2007/0178819 A1* | 8/2007 | McKenna | A22B 5/007 452/157 |
| 2018/0333752 A1* | 11/2018 | Yoon | B07C 5/10 |

(Continued)

OTHER PUBLICATIONS

Seung-Chul Yoon, S-C., Brian C. Bowker, Hong Zhuang, and TaeSung Shin. 2016. 3D imaging for objective detection of wooden breast meat. Poult. Sci. 95 (E.Suppl.1):526P (Abstr).

(Continued)

*Primary Examiner* — Pakee Fang
(74) *Attorney, Agent, or Firm* — Crowe & Dunlevy, P.C.

(57) ABSTRACT

This invention relates generally to a system and method of detecting woody breast using image analysis of carcass features, and more particularly to a real-time system and method of detecting woody breast in broilers using non-destructive and/or non-contact image analysis of carcass features. The system and method assess woody breast in broilers at the fillet level using image analysis of the angle or area associated with the tip of the keel bone and surrounding breast meat of broiler carcasses. The method is configured be incorporated into and utilized by vision grading system.

19 Claims, 17 Drawing Sheets

(56) References Cited

U.S. PATENT DOCUMENTS

2019/0170468 A1* 6/2019 Adcock .................. B08B 9/021

OTHER PUBLICATIONS

Sun, X., F. L Yang, J. L Solo, V. V Tijare, Yanbin Li, and C. M. Owens. 2015. Using instrumental compression to assess hardness of woody breast fillets and changes during short term storage. Poult. Sci. (E. Suppl.1): 270 (Abstr.).

Tijare, V.V., F. Yang, C.Z. Alvarado, C. Coon, and C.M. Owens. 2016. Meat quality of broiler breast fillets with white striping and woody breast muscle myopathies. Poult. Sci., vol. 95, Issue 9, Sep. 1, 2016, pp. 2167-2173.

\* cited by examiner

SYSTEM AND METHOD FOR DETECTING WOODY BREAST CONDITION IN BROILERS USING IMAGE ANALYSIS OF CARCASS FEATURES

CROSS REFERENCE TO RELATED APPLICATIONS

This application claims the benefit of U.S. Provisional Patent Application Ser. No. 62/522,332 entitled PREDICTION OF WOODY BREAST USING IMAGE ANALYSIS OF CARCASS FEATURES filed on Jun. 20, 2017, and incorporates said provisional application by reference in its entirety into this document as if fully set out at this point.

BACKGROUND OF THE INVENTION

1. Field of the Invention

This invention relates generally to a system and method for detecting woody breast condition in broilers using image analysis of carcass features, and more particularly to an automated and/or real-time vision grading system and method for detecting and grading woody breast condition in broilers using non-destructive and/or non-contact image analysis of carcass features.

2. Description of the Related Art

In the United States, poultry is widely popular by consumers and is the top protein consumed. Due to the popularity of chicken and of boneless breast meat, geneticists have selected for rapid growth and greater breast yield among other traits. From 1957 to 2005, broiler weights quadrupled and breast meat yield (Pectoralis major) increased by approximately 80%. In the last decade along with improvements in growth performance (including breast yield), producers have extended growth periods, all in efforts to increase bird size. The increased size allows for more kilograms per man hour to be processed thereby reducing cost and improving process efficiency. In the U.S., the average live weight of birds in this segment is now over 6 lbs. The big bird (>6 lbs.) market segment makes up 55% of the overall market (based on number of head produced) in the U.S., with approximately 70% of the broiler meat in the U.S. coming from large birds. This trend for increased bird size and the increased percentage of the market will likely continue.

Producing an adequate supply of broiler meat is a primary goal of the industry, but producing high quality meat is also an important goal. In recent years, the industry has observed an increase in growth related myopathies associated with the breast meat which have become a serious economic issue. Specifically, the two major issues that have become most apparent in recent years are white striping (WS) and woody breast (WB) muscle. The severity of the conditions can vary, and both have been associated with heavier, fast growing birds, especially from high breast yielding broiler strains. These myopathies are issues around the world that have major economic implications, based on 10 to 40% incidence of moderate/severe cases, depending on size and/or strain of bird. These severe cases can result in unnecessary condemnations, decreased meat quality and yield, changed nutritional content, and continued reduced customer/consumer acceptance (resulting in lost customer accounts, leading to losses of $200 million (conservative estimate). Recently, there has been increased consumer awareness (general public) about WS and WB in poultry meat through articles and advertisements published by national news and social media. While some reports are fact-based, others have had a negative sensationalistic aspect along with misinformation. This increased consumer awareness, especially based on misinformation, can lead to decreased acceptance of poultry meat in a variety of markets.

One of the current major quality defects in the broiler industry is a defect referred to as "Woody" or "Wooden" breast. The condition can be characterized by breast tissue that is hard to the touch. This hardness can be present in the live bird prior to processing and even in the grow-out period as early as a few weeks old (detected by palpation) in addition to the postmortem period. The degree of hardness can be identified using tactile evaluation and a scoring system can be used to categorize fillets. Briefly, some fillets can be hardened throughout with very limited flexibility (severe) while others can be hardened but with some flexibility toward the mid part of the fillet (moderate). Mild fillets would have slight hardness in the cranial region and normal fillets would be flexible throughout (no hardness present). Woody breast exhibits histological signs of muscle fiber degeneration and fibrosis. The incidence can be up to 30% for moderate and severe cases, especially in heavy debone broilers. These moderate and severe cases cause issues in meat quality such as loss of water holding capacity and texture issues that result in downgrades and even condemnations.

These defects can cause potential problems with processing methods such as deboning, portioning and even problems with marination in terms of pickup along with sensory qualities. More recent research showed as that severity of WS or WB increased, marination uptake decreased, and cook loss of non-marinated and marinated fillets both increased with increasing severity of WS or WB. Texture can be greatly impacted with WB having a crunchy, fibrous, and chewy texture. Numerous major restaurants have been receiving consumer complaints associated with poor texture (e.g., rubbery, chewy, tough) of chicken breast products. More of these restaurants are now requiring plants to sort fillets to eliminate or limit the amount of woody breast they receive. The hardness of fillets, as well as the prominent ridge associated with WB, can also cause problems with portioning processes. The hardness associated with WB decreases over time; however, this is not likely to change the cooked meat quality attributes associated with WB.

Grinding and forming patties with woody breast meat may be a way to use the product, to improve product quality over WB whole muscle products. However, recent studies have shown that severe woody breast should be mixed with meat with normal or mild characteristics of WB, as it can still have negative meat quality attributes when used at 100% in formulation. Other ground products such as sausages may also be alternatives to using WB as whole muscle.

On-line process control is a developing area for poultry processing because it can allow processors to have more real time process control. Vision grading systems are used in the industry to help sort product before cut-up processes to maximize profitability of cuts. Data collected using existing vision grading systems include identification of missing parts and body dimensions among other features. Other technologies are also in current development in other labs including image analysis of fillets (USDA ARS) and compositional analysis of meat (Auburn University). The use of instrumental compression force may also be another tool to detect and sort WB in the plant.

However, WB has some shape characteristics that are visible at the carcass level independent of carcass age or strain. Automation of these measurements would allow for the potential integration into current on-line vision grading systems, and allow broilers processing plants to identify and sort broiler carcasses by WB condition.

It is therefore desirable to provide a system and method for detecting woody breast condition in broilers using image analysis of carcass features.

It is further desirable to provide an automated and/or real-time system and method for detecting and grading woody breast condition in broilers using non-destructive and non-contact image analysis of carcass features.

It is still further desirable to provide a vision grading system and method for detecting and grading woody breast condition in broilers at the fillet level using based on predetermined carcass features.

It is yet further desirable to provide an automated and/or real-time vision grading system and method for detecting and grading woody breast condition in broilers carcasses prior to evisceration.

It is still yet further desirable to provide an automated and/or real-time system and method for detecting and grading woody breast condition in broilers that is configured be incorporated into commercially available vision grading systems, resulting in a cost-effective implementation in existing processing plants.

It is still yet further desirable to provide an automated and/or real-time vision grading system and method for detecting factors in live broiler production (e.g., flock characteristics, flock performance, environment, etc.) that contribute to woody breast condition.

Before proceeding to a detailed description of the invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

SUMMARY OF THE INVENTION

In general, in a first aspect, the invention relates to a method of detecting woody breast condition in a broiler carcass using image analysis. The method includes the steps of acquiring a digital image of the broiler carcass, detecting a presence of woody breast condition in the broiler carcass using image analysis of at least one carcass feature of the image of the broiler carcass, and grading or categorizing a severity of any detected presence of the woody breast condition in the broiler carcass.

The digital image of the broiler carcass may be against a background having a sharp outline of the broiler carcass, and woody breast condition in the broiler carcass can be detected using non-destructive and non-contact image analysis controlled by an on-line process control system. Moreover, the method can grade or categorize the severity of any detected woody breast condition as mild, moderate or severe using an automated, real-time vision grading system.

The method can detect the presence of the woody breast condition in the broiler carcass by computing at least one measurement of a caudal region of the broiler carcass. The method computes a breast width of a cranial region of the carcass (M1) and a length from a tip of a keel bone of the broiler carcass to ⅕th of a total breast length of the broiler carcass (M2). The method can then electronically compute a breast width at an end of M2, wherein the breast width at the end of M2 (M3). The method can also calculate an angle formed at a tip of a keel bone of the broiler carcass (M4). An area of a triangle formed by M3 and M4 (M5) and/or an area of the caudal region formed above M3 (M6) can also be computed. In addition, the method can electronically compute a difference of the area M6 and the area M5 (M7). Moreover, a ratio of M3 to M1 (M8), of M3 to M2 (M9), and/or of M7 to M5 (M10) can be computed and utilized for grading any detected woody breast condition in the broiler carcass.

In general, in a second aspect, the invention relates to a method for automated vision grading of woody breast condition in a broiler carcass. In this aspect, the method includes the steps of computing at least one measurement of a caudal region of the broiler carcass from a digital image of the broiler carcass, and then based on the measurement of the caudal region of the broiler carcass, detecting a presence of woody breast condition in the broiler carcass using non-destructive and non-contact image analysis of the digital image, and for any detected presence of the woody breast condition, grading or categorizing a severity of the woody breast condition in the broiler carcass, such as mild, moderate or severe.

Similar to the first aspect, the method initially computes a breast width of a cranial region of the carcass (M1) and a length from a tip of a keel bone of the broiler carcass to ⅕th of a total breast length of the broiler carcass (M2). The at least one measurement of the caudal region of the broiler carcass can then include: a breast width at an end of M2, wherein the breast width at the end of M2 is M3; an angle formed at a tip of a keel bone of the broiler carcass, wherein the angle is M4; an area of a triangle formed by M3 and M4, wherein the angle M4 extends to end points of M3, and wherein the area of the triangle is M5; an area of the caudal region formed above M3, wherein the area of the caudal region formed above M3 is M6; a difference of the area M6 and the area M5, wherein the difference is M7; a ratio of M3 to M1, wherein the ratio of M3 to M1 is M8; a ratio of M7 to M5, wherein the ratio of M7 to M5 is M10; a ratio of M3 to M2, wherein the ratio of M3 to M2 is M9; or a combination thereof.

Moreover, the method may include acquiring the digital image of the broiler carcass against a background having a sharp outline of the broiler carcass. The method then may use non-destructive and non-contact image analysis of the digital image of the broiler carcass controlled by an on-line process control system.

The foregoing has outlined in broad terms some of the more important features of the invention disclosed herein so that the detailed description that follows may be more clearly understood, and so that the contribution of the named inventors to the art may be better appreciated. The invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

These and further aspects of the invention are described in detail in the following examples and accompanying drawings.

DETAILED DESCRIPTION OF THE INVENTION

Figure 1:
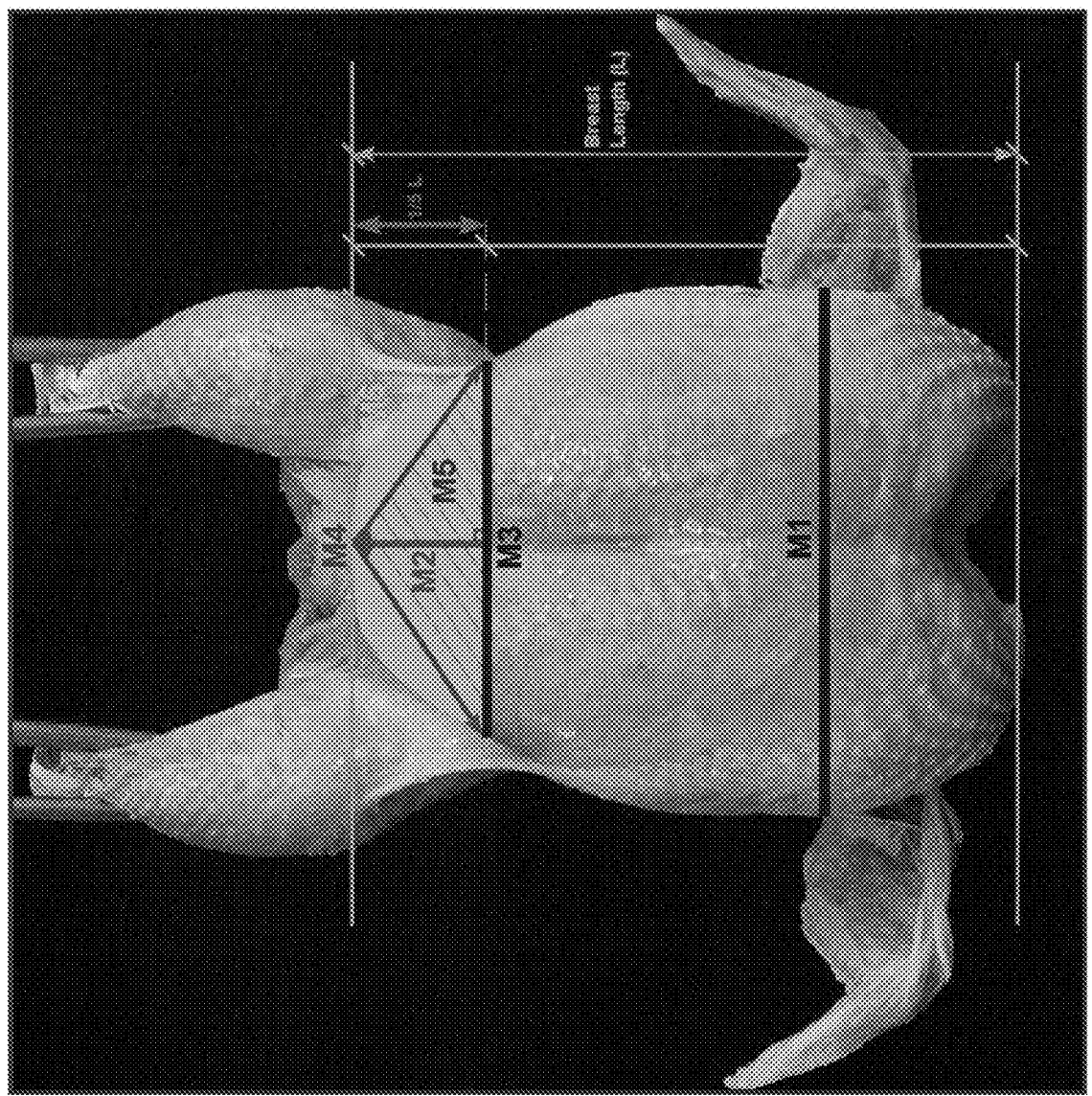
FIG. 1 is an image of a carcass showing measurements extracted and calculated from an image of a broiler carcass in accordance with an illustrative embodiment of the invention disclosed herein.
Figures 2A, 2B, 2C:
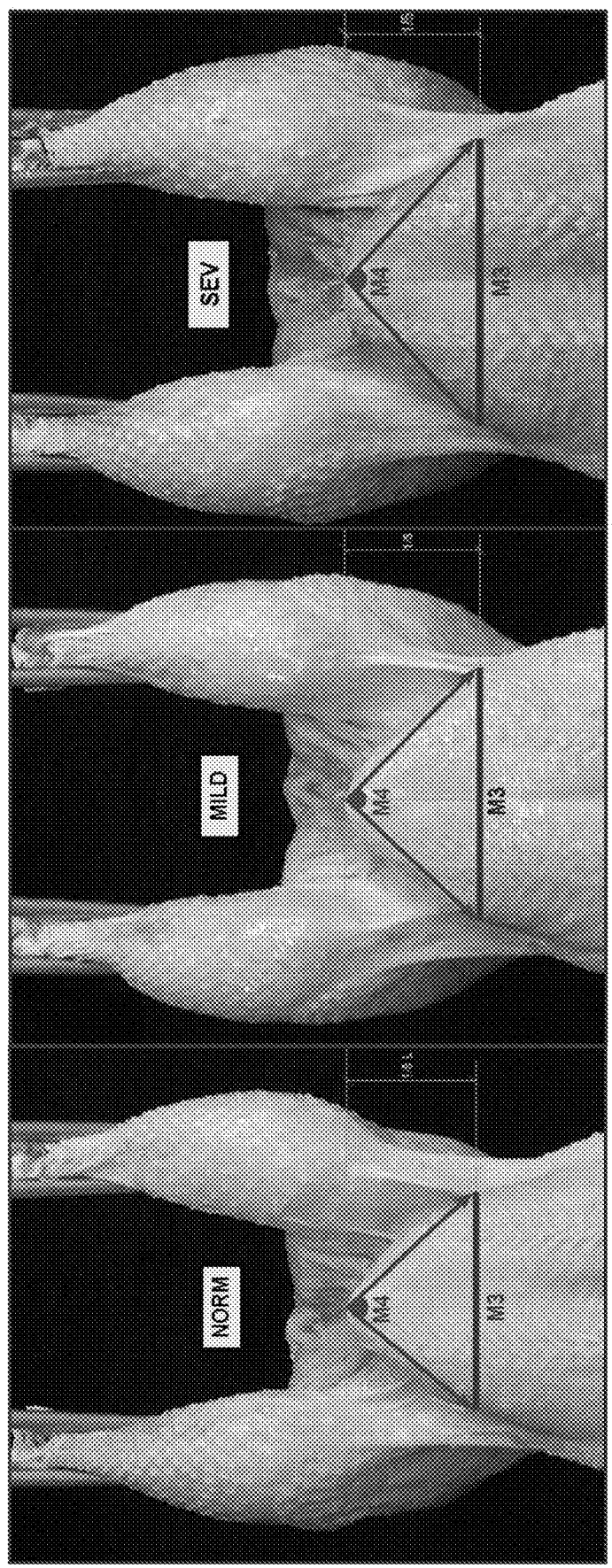
FIG. 2A is an image of a broiler carcass graded with normal woody breast based on measurements of a breast width at a caudal region (M3) and an angle at a tip of the keel bone (M4) of the broiler carcass in accordance with an illustrative embodiment of the invention disclosed herein.
FIG. 2B is an image of a broiler carcass with mild woody breast that has been graded based on the same measurements of FIG. 2A.
FIG. 2C is an image of a broiler carcass with severe woody breast that has been graded based on the same measurements of FIG. 2A.
Figures 3A, 3B, 3C:
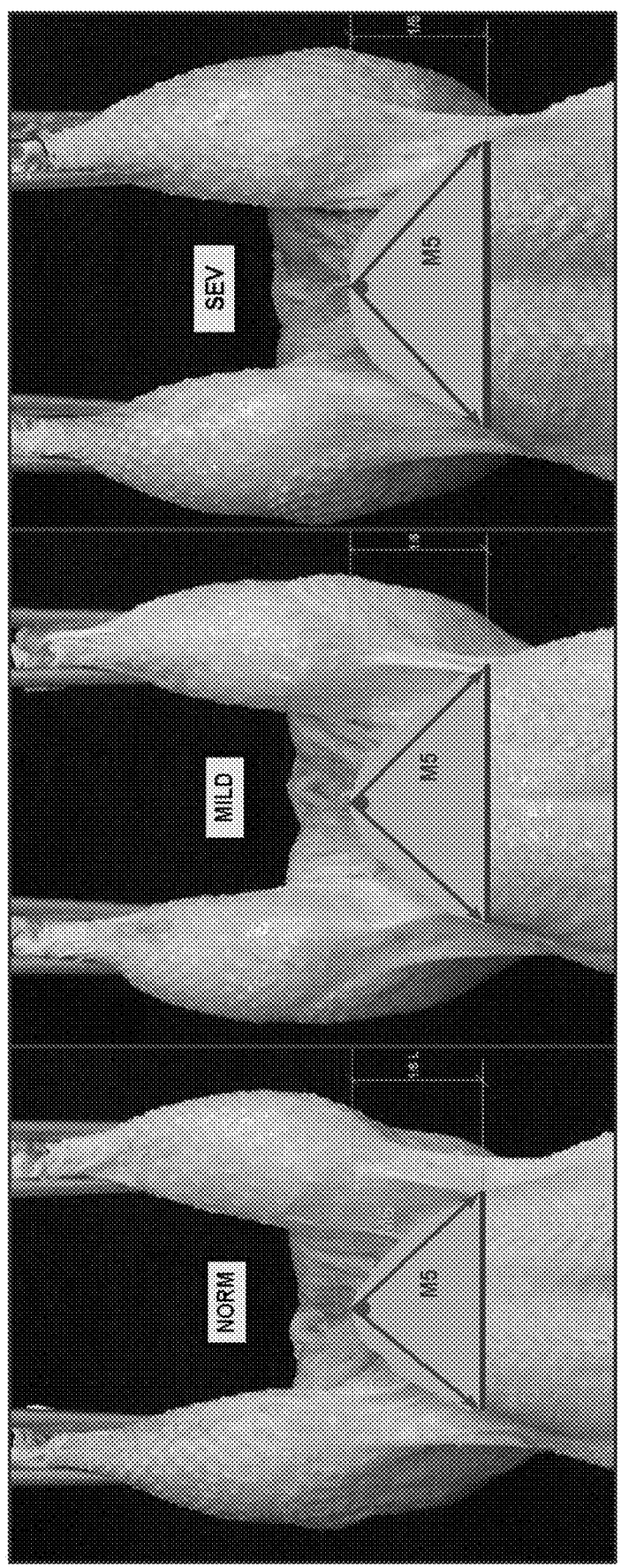
FIG. 3A is an image of a broiler carcass graded with normal woody breast based on measurements of an area of a triangle formed by M3 and lines generated by M4 (M5) and of an area of the breast formed above M3 (M6) of the broiler carcass in accordance with an illustrative embodiment of the invention disclosed herein.
FIG. 3B is an image of a broiler carcass with mild woody breast that has been graded based on the same measurements of FIG. 3A.
FIG. 3C is an image of a broiler carcass with severe woody breast that has been graded based on the same measurements of FIG. 3A.
Figures 4A, 4B, 4C:
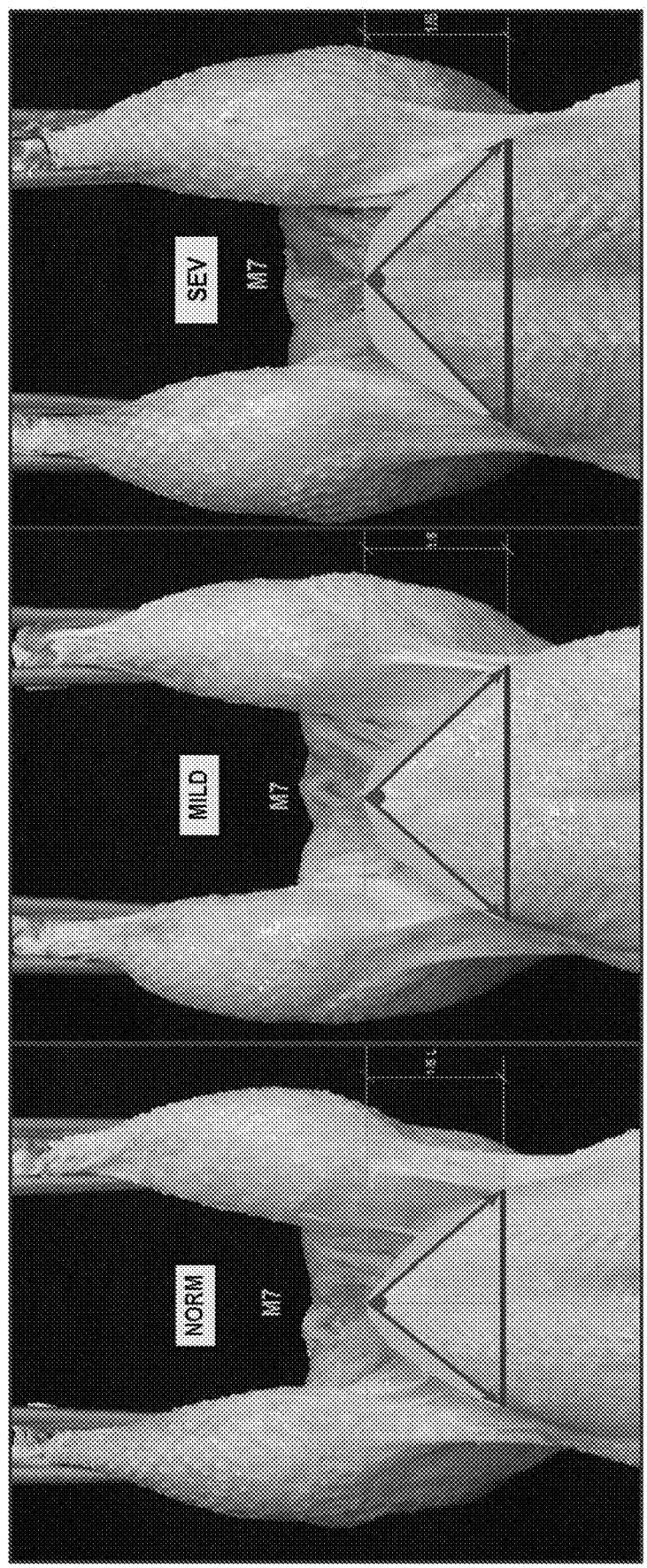
FIG. 4A is an image of a broiler carcass graded with normal woody breast based on measurements of a difference of the areas of M6 and M5 (M7) of the broiler carcass in accordance with an illustrative embodiment of the invention disclosed herein.
FIG. 4B is an image of a broiler carcass with mild woody breast that has been graded based on the same measurements of FIG. 4A.
FIG. 4C is an image of a broiler carcass with severe woody breast that has been graded based on the same measurements of FIG. 4A.
Figure 5:
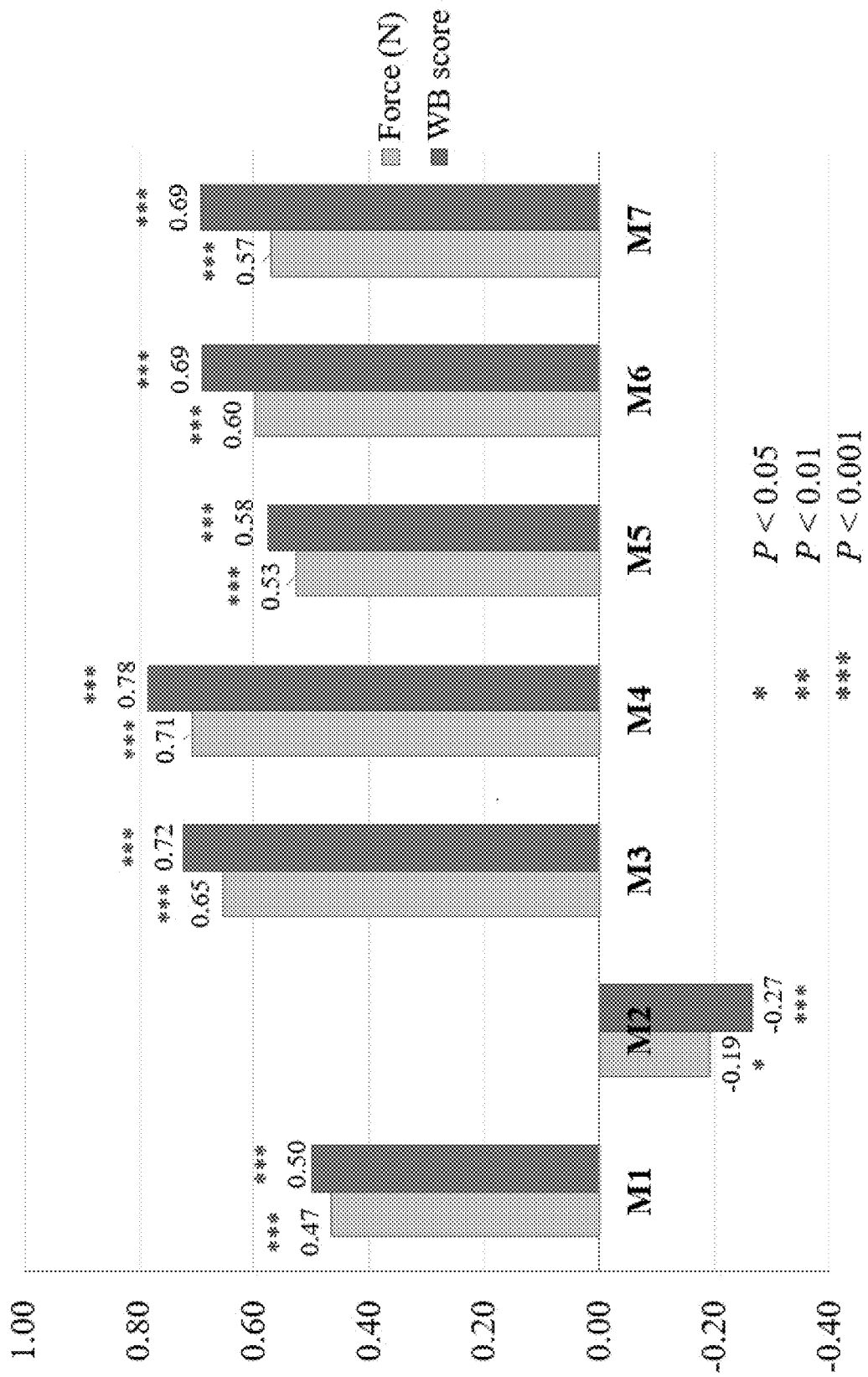
FIG. 5 is a graphical representation of the correlations coefficients (r) of carcass measurements to compression force and WB scores.

While this invention is susceptible of embodiment in many different forms, there is shown in the drawings, and will herein be described hereinafter in detail, some specific embodiments of the invention. It should be understood, however, that the present disclosure is to be considered an exemplification of the principles of the invention and is not intended to limit the invention to the specific embodiments so described.

This invention relates generally to a system and method for detecting woody breast condition in broilers using image analysis of carcass features, and in particular to an automated and/or real-time vision grading system and method for detecting and grading woody breast condition in broiler carcasses using non-destructive and non-contact image analysis. The method is configured be incorporated into and utilized by an automated vision grading system.

The system and method takes or otherwise acquires a digital image of the broiler carcass and then detects the presence of woody breast (Pectoralis major) features based on measurements of the broiler carcass. The system and method use the image analysis to extract and compute various measurements of the broiler carcass, such as a breast width at a caudal region (M3), an angle at a tip of the keel bone (M4) of the broiler carcass, an area of a triangle formed by M3 and lines generated by M4 (M5), an area of the breast formed above M3 (M6) of the broiler carcass, a difference of the areas of M6 and M5 (M7) of the broiler carcass, and/or various ratios of those measurements (i.e., M8 (M3/M1), M9 (M3/M2), and M10 (M7/M5)). Based on the measurements, the system and method then grades any detected incidents of woody breast condition in predetermined categories, such as mild, moderate or severe.

EXAMPLES

The system and method for detecting woody breast condition in broilers using image analysis of carcass features disclosed herein is further illustrated by the following examples, which are provided for the purpose of demonstration rather than limitation.

Processing of Birds:

Male broiler carcasses from three commercial strains (2 high breast yielding strains and 1 standard breast yielding strain) and five ages (6, 7, 8, 9 and 10 weeks) were evaluated. A total of 1,203 broiler carcass images were collected in nine-month period at 13 different processing dates between October 2016 and July 2017. All birds were processed at the University of Arkansas Poultry Processing Pilot Plant according to commercial practices wherein birds were weighed, shackled, electrically stunned (11 V, 11 mA, 11 s), manually slaughtered, bled out (1.5 min), scalded (54° C., 2 min), picked in-line using defeathering equipment, manually eviscerated, and washed.

Three experiments were conducted over the project period. Experiment 1 used data (n=180) from 7 and 10 wk old broiler from 2 strains. Experiment 2 used a subset of data (n=156) and included compression analysis. Experiment 3 incorporated all carcasses (n=1203) used in project for model development.

Image Collection:

Images of broiler carcasses were captured prior to evisceration against a black background to have a sharp outline of the carcass conformation (FIGS. 1-4). A Canon EOS 60D digital single lens reflex (DSLR) camera was used to capture images. The camera was placed centrally in front of the carcass at 1.32 m of distance from the camera lens to the shackle line. For image collection, it was used a setup of 2592×1728 pixels, spatial resolution of 72 ppi. Images were captured with exposure time of 1/60 s and opening f/5 with a format of JPG image file.

Deboning and Tactile Evaluation:

Broiler carcasses were deboned by severing the humeral-scapular joint and pulling firmly downward on the wings. The deboned breast fillets were scored for degree of hardness using tactile evaluation. The categorization considered for the experiment was the following: 0 or 0.5 as normal (NOR); 1 or 1.5 as mild (MIL), and 2, 2.5 or 3 as severe (SEV).

Compression Analysis:

Compression force (N) was determined on intact fillets (n=156; Experiment 2) in quadruplicate at predetermined locations in the cranial region of each fillet. Compression force was determined using a Texture Analyzer (Model TA.XT Plus, Texture Technologies Corp, Hamilton, Mass.) with a 5-kg load cell using a 6 mm diameter flat probe. The sample was compressed to 20% of height and maximum force (N) to compress the area was determined.

Image Analysis:

After collection, 2-dimensional (2D) and frontal images were processed using the ImageJ software (National Institutes of Health). Some image processing functions were used such as vertical rotation and sharpening. The parameters for carcass conformation considered for this study were: M1, M2, M3, M4, M5, M6, and M7, as described in Table 1 and shown in FIGS. 1, 2, 3 and 4. In addition, three ratios [M8 (M3/M1), M9 (M3/M2), and M10 (M7/M5)] were considered.

TABLE 1

Measurements of structural information extracted from broiler carcass images

| Measurement | Description |
| --- | --- |
| M1 (mm) | breast width in the cranial region |
| M2 (mm) | a vertical line from the tip of keel to 1/5th of breast length (right side) |
| M3 (mm) | breast width at the end of M2 |
| M4 (°) | angle formed at the tip of keel and extending to outer points of M3 |
| M5 (mm$^2$) | area of the triangle formed by M3 and lines generated by M4 |
| M6 (mm$^2$) | area of the breast section formed above M3 |

TABLE 1-continued

Measurements of structural information extracted from broiler carcass images

| Measurement | Description |
| --- | --- |
| M7 (mm$^2$) | M6-M5 (difference between M6 and M5) |
| M8 | The ratio M3/M1 |
| M9 | The ratio M3/M2 |
| M10 | The ratio M7/M5 |

Experiment 1

Experiment 1 demonstrates that image analysis method is a reliable method to identify WB in commercial high breast yielding broiler carcasses from 7 and 10 weeks of age.

Carcass measurements were evaluated to determine the effect of strain, age, and woody breast category on carcass breast shape conformation. Strain impacted most measurements (M2, M3, M4 and M7) while age impacted all measurements (P<0.05). This was expected as the broiler will get larger with age and thus have larger measurements of carcass features. Woody breast category impacted (P<0.05) all measurements with exception of M2. There was also an interaction (P<0.05) of age and WB category (with exception of M7) while no interaction of strain and age were noted or strain by WB (with exception to M6). Table 2 below shows means for carcass measurements for the age by WB category interaction. Though an interaction was present, the means for WB categories generally showed the same trends at each age. The cranial width (M1) significantly increased from normal to severe with the mild being intermediate. M2 is 20% of the carcass length (breast area) and this increased (P<0.05) with age, but not with WB breast severity (P>0.05). The breast width at the caudal region also increased (P<0.05) with age and increasing degrees of WB severity. The M4 (representing an angle at point of keel) also increased (P<0.05) with age and WB severity. The area in the caudal region also increased with age and WB severity. This increase in is explained by the increased width of the caudal region. Furthermore, M6 and M7 increased significantly with increasing degrees of WB severity, suggesting that the breast shape is fuller creating a more U-shape rather than V-shape. The U-shaped breast is more characteristic of a carcass with severe woody breast (examples shown in FIG. 3).

Figure 11:
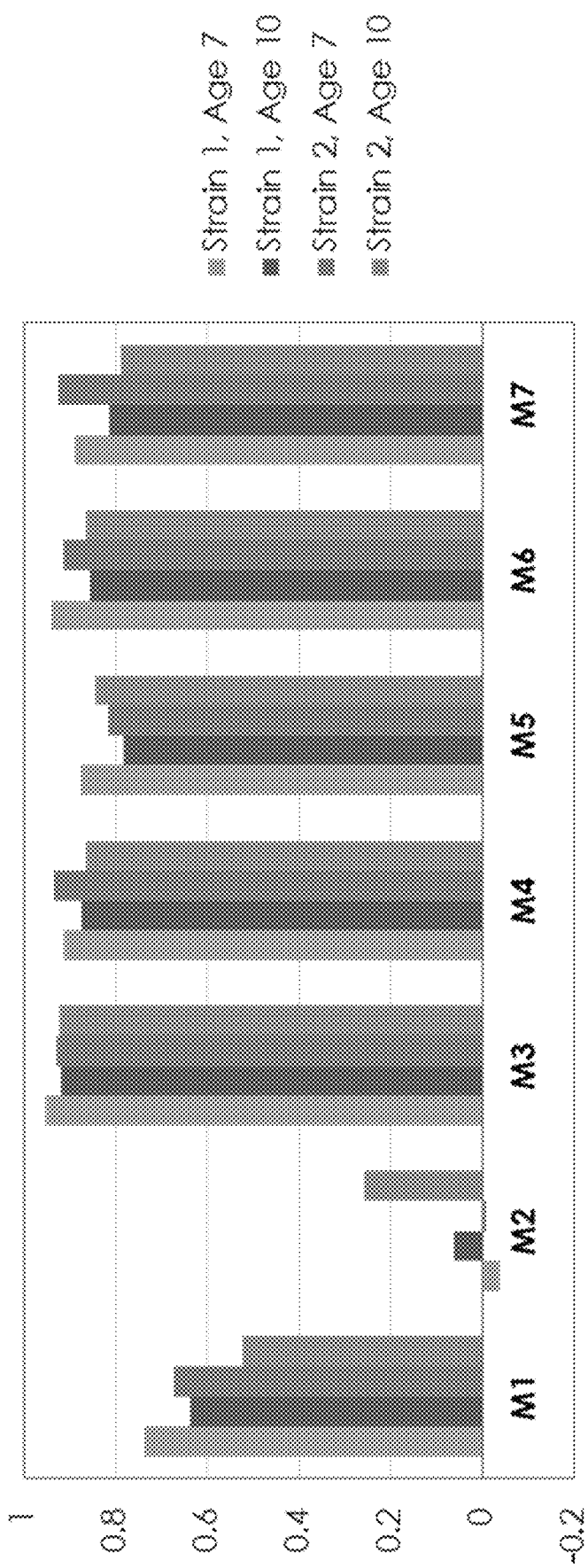
FIG. 11 is a graphical representation of correlations between image measurements and woody breast (WB) severity of broiler carcasses from two strains and ages.

Correlation coefficients of WB scores and carcass measurements are shown strain by age in Table 3 and FIG. 11. With exception of M2, most carcass measurements were highly correlated to WB score. M3 through M7 were very highly correlated to WB score. The M3 (breast width at caudal region) had the highest correlation to WB severity regardless of strain and age (r=0.92 to 0.95, p<0.0001), while M4 (angle at tip of keel) and M6 also had high correlations to WB severity with some impact of age. These results suggest a strong relationship between WB severity and carcass features; this provides a basis for further evaluation of the use of image analysis of carcass features to predict woody breast.

TABLE 2

Means of physical carcass measurements of broilers 7 and 10 wk of age by WB category.

| Age | WB | M1 (mm) | M2 (mm) | M3 (mm) | M4 (°) | M5 (mm$^2$) | M6 (mm$^2$) | M7 (mm$^2$) |
|---|---|---|---|---|---|---|---|---|
| 7 wk | NORM | 152.38$^d$ | 46.69$^b$ | 92.75$^e$ | 88.81$^e$ | 2,212.66$^e$ | 2,840.81$^e$ | 622.62$^d$ |
|  | MILD | 166.41$^c$ | 47.74$^b$ | 103.20$^d$ | 94.75$^d$ | 2,521.63$^d$ | 3,357.20$^d$ | 835.57$^c$ |
|  | SEV | 169.76$^c$ | 46.90$^b$ | 116.41$^{bc}$ | 102.02$^b$ | 2,786.96$^c$ | 3,897.06$^c$ | 1,110.10$^b$ |
| 10 wk | NORM | 183.20$^b$ | 52.02$^a$ | 114.44$^c$ | 94.67$^d$ | 3,027.59$^b$ | 3,925.85$^c$ | 898.26$^c$ |
|  | MILD | 183.48$^b$ | 51.34$^a$ | 119.86$^b$ | 99.56$^c$ | 3,137.98$^b$ | 4,164.36$^b$ | 1,026.38$^b$ |
|  | SEV | 194.18$^a$ | 52.48$^a$ | 137.88$^a$ | 105.00$^a$ | 3,677.98$^a$ | 5,018.54$^a$ | 1,340.56$^a$ |

$^{a-e}$Means with no common superscript within column differ (P < 0.05).
n = 15 per mean

TABLE 3

Correlation coefficients of woody breast score and physical carcass measurements from 2 strains of broilers 7 and 10 weeks of age.

| Strain | Age | M1 | M2 | M3 | M4 | M5 | M6 | M7 |
|---|---|---|---|---|---|---|---|---|
| Strain 1 | 7 | 0.7359 | −0.0405 | 0.9520 | 0.9124 | 0.8761 | 0.9385 | 0.8892 |
|  |  | <.0001 | 0.7914 | <.0001 | <.0001 | <.0001 | <.0001 | <.0001 |
|  | 10 | 0.6374 | 0.0600 | 0.9170 | 0.8714 | 0.7820 | 0.8538 | 0.8130 |
|  |  | <.0001 | 0.6951 | <.0001 | <.0001 | <.0001 | <.0001 | <.0001 |
| Strain 2 | 7 | 0.6731 | −0.0083 | 0.9267 | 0.9332 | 0.8164 | 0.9116 | 0.9236 |
|  |  | <.0001 | 0.9564 | <.0001 | <.0001 | <.0001 | <.0001 | <.0001 |
|  | 10 | 0.5225 | 0.2583 | 0.9228 | 0.8639 | 0.8435 | 0.8635 | 0.7895 |
|  |  | 0.0002 | 0.0866 | <.0001 | <.0001 | <.0001 | <.0001 | <.0001 |

Experiment 2

Experiment 2 was conducted to evaluate the relationship of compression force to carcass measurements. Compression force is an instrumental method to assess fillet hardness and can provide a more objective method to classify fillets into WB categories. After scoring fillets via palpation (tactile evaluation), fillets were subjected to compression analysis. Compression force significantly increased (P<0.05) with WB category as expected (Table 4). All other carcass measurements increased (P<0.05) with increasing degrees of WB severity, which supports the results obtained in Experiment 1.

Figure 6:
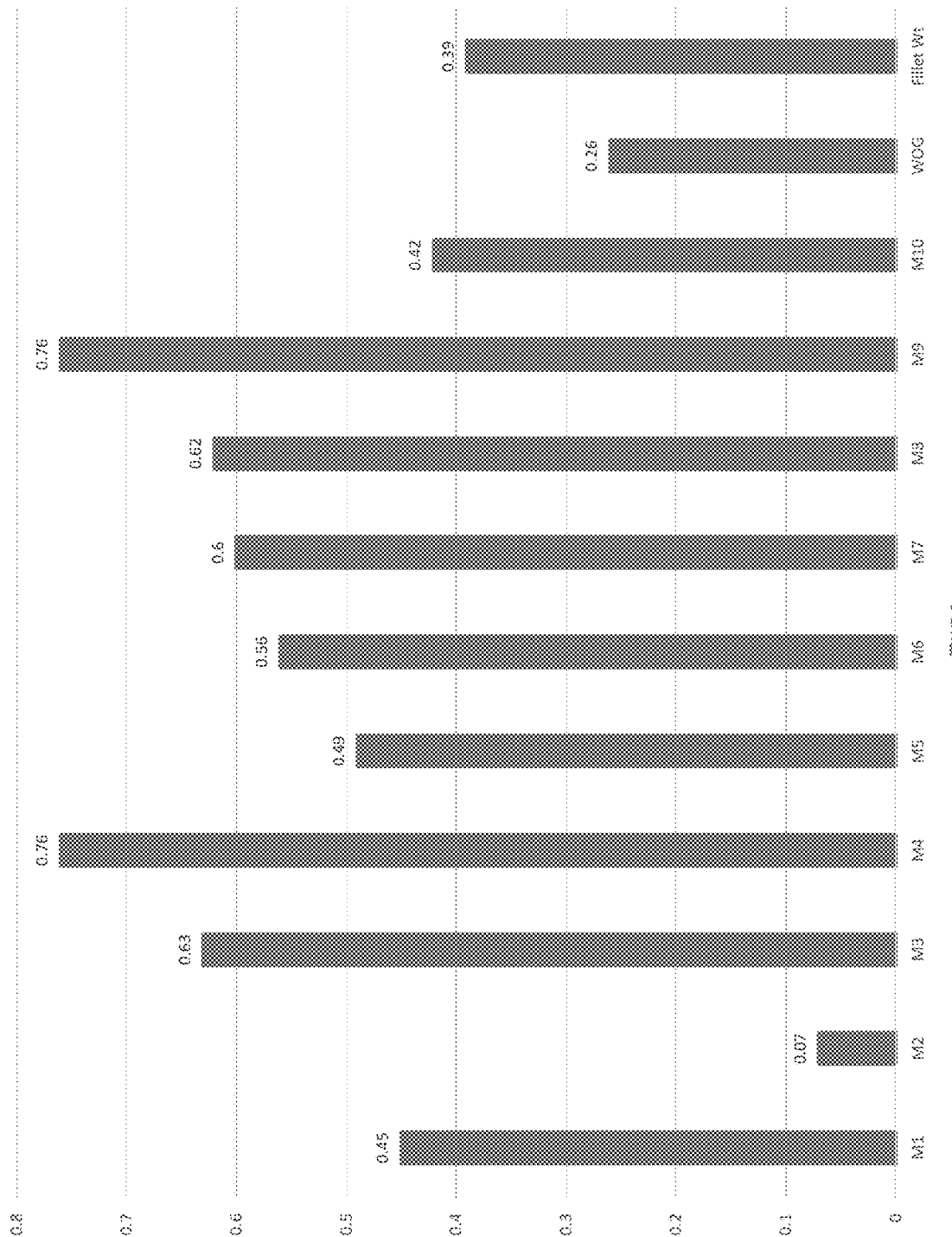
FIG. 6 is a graphical representation of the correlation coefficients (r) of carcass measurements, carcass weight without giblets (WOG) and fillet weight to WB score.

FIG. 6 shows the correlations between either woody breast score or compression force and the various carcass measurements. With exception to M2, all correlations were moderate to high. M4 (angle at keel) and M3 (caudal width) had the highest correlation to WB score (r=0.78 and 0.72, respectively; P<0.01) and compression force (r=0.71 and 0.65, respectively; P<0.01) followed by measurements M6, M7, M5 and M1, respectively (r=0.47 to 0.69, P<0.01), whereas M2, showing the lowest coefficients, was inversely correlated with WB score (r=−0.27, P<0.01) and compression force (r=−0.19, P<0.05).

These data support the system and method for detecting woody breast condition in broilers carcass using image analysis disclosed herein. The potential integration of these image measurements into an in-line vision grading technology would allow processors to identify and sort broiler carcasses by WB category.

TABLE 4

Means of compression force and physical carcass measurements from broiler breast fillets exhibiting various degrees of woody breast.

| WB | Force(N) | M1 | M2 | M3 | M4 | M5 | M6 | M7 |
|---|---|---|---|---|---|---|---|---|
| NOR | 5.16$^c$ | 186.97$^c$ | 53.43$^a$ | 121.00$^c$ | 96.98$^c$ | 3232.91$^c$ | 4157.36$^c$ | 924.45$^c$ |
| MIL | 8.15$^b$ | 192.10$^b$ | 52.74$^{ab}$ | 130.76$^b$ | 102.01$^b$ | 3450.51$^b$ | 4562.56$^b$ | 1112.05$^b$ |
| SEV | 12.40$^a$ | 196.08$^a$ | 52.23$^b$ | 141.67$^a$ | 107.10$^a$ | 3701.68$^a$ | 5136.39$^a$ | 1434.71$^a$ |

$^{a-c}$Means with no common superscript within column differ (P < 0.05)

Experiment 3

Modelling:

Experiments 1 and 2 above developed the initial relationships between various carcass measurements and woody breast fillet score. Experiment 3 evaluated a larger data set to determine models for predicting woody breast based on carcass features. Images (n=1203) collected from broilers 6 to 10 weeks of age were used to develop models for predicting woody breast based on a wide range of data by using multiple ages and strains (i.e., different sizes and shape characteristics).

Figure 7:
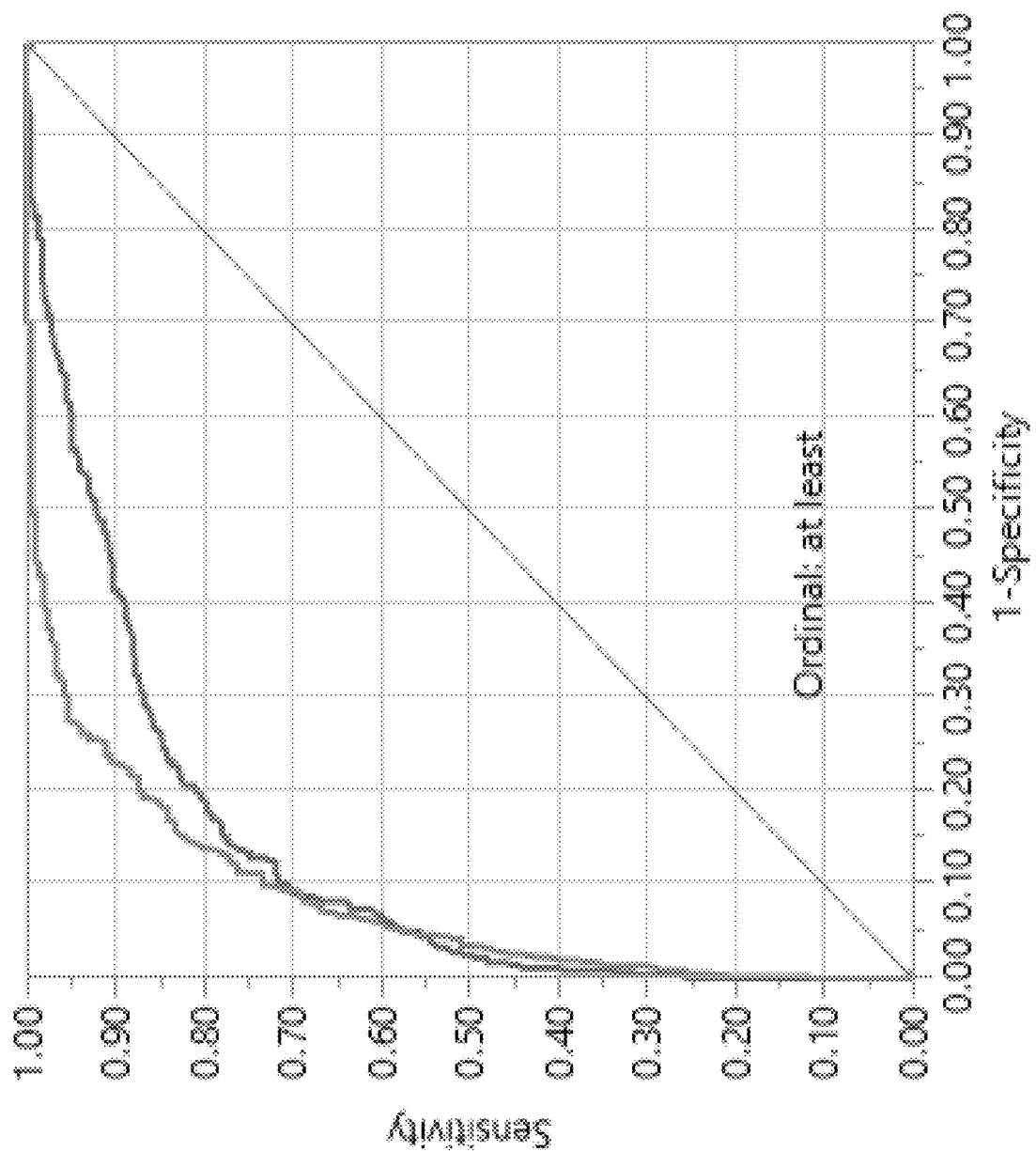
FIG. 7 is a graphical representation of sensitivity rates of mild and severe woody breast categories using a 4 factor model.

Correlations between woody breast scores (deboned fillets) and carcass measurements followed similar trends as in Experiments 1 and 2 (FIG. 7). M4 (angle at keel), M9 (the ratio M3/M2) and M3 (caudal width) had the highest correlation to WB score (r=0.76, 0.76 and 0.63, respectively; P<0.01) followed by measurements M8, M7, and M6, respectively (r=0.62 to 0.56, P<0.01).

Figure 8:
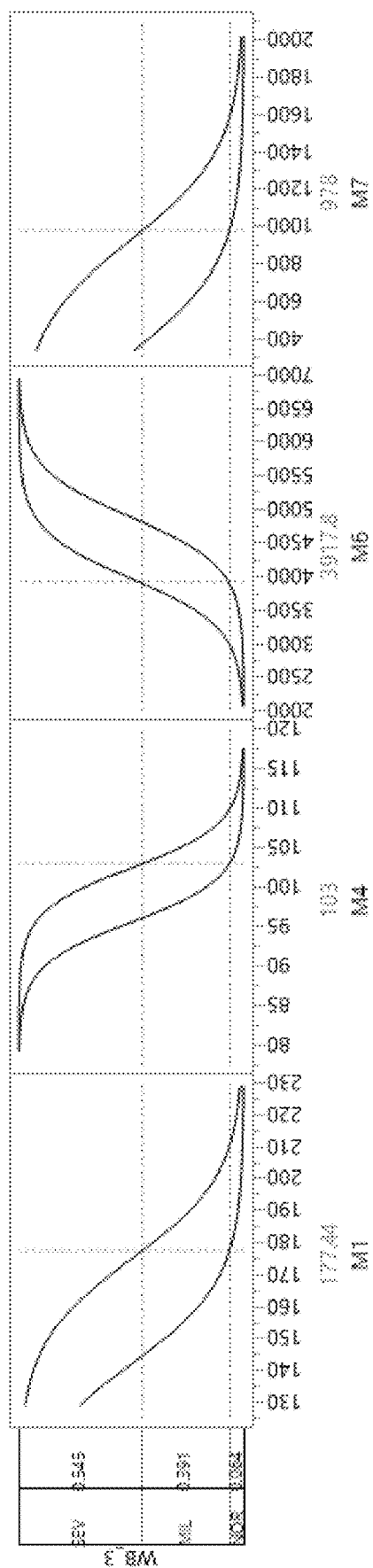
FIG. 8 is a prediction profiler of model with three categories of woody breast.
Figure 9A:
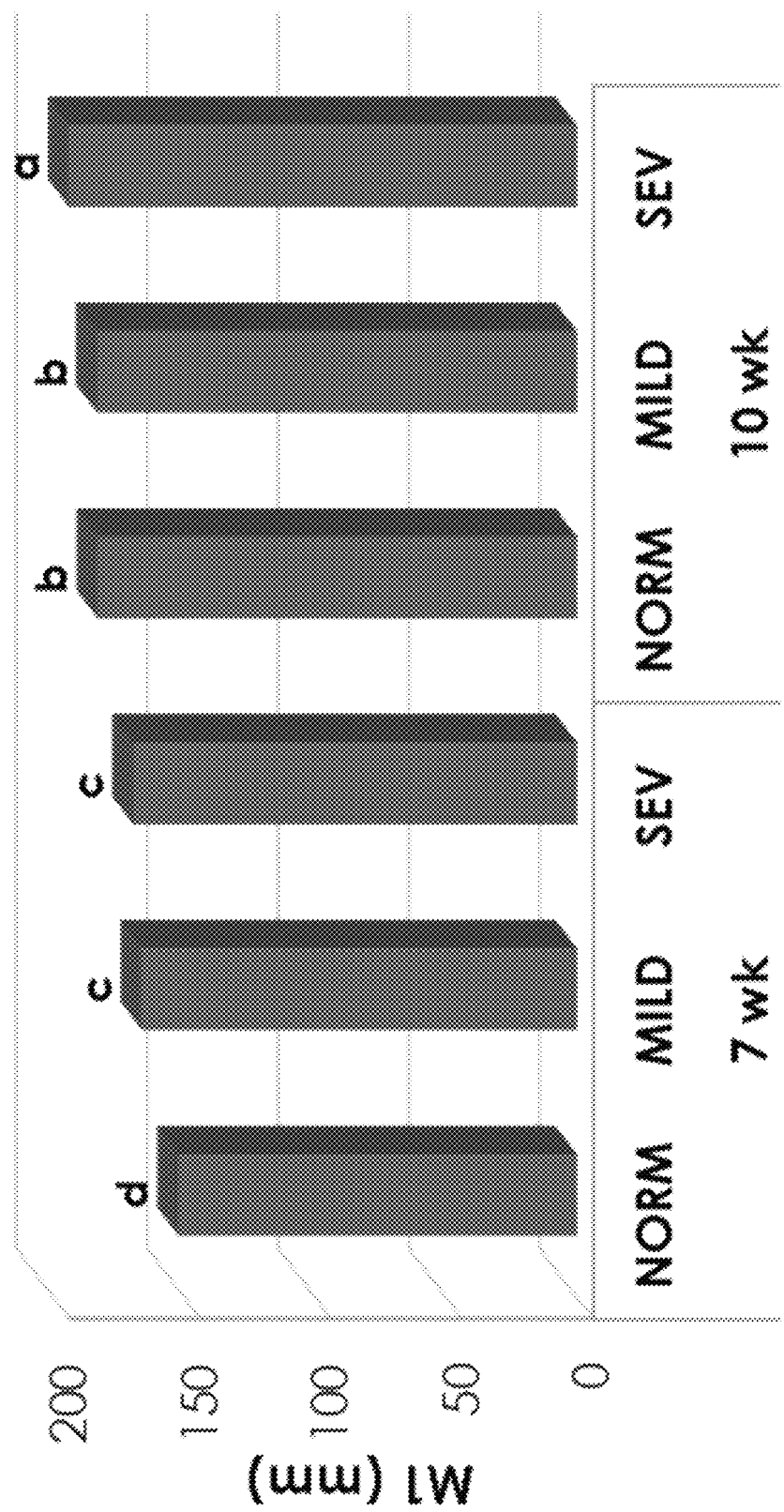
FIG. 9A is a graphical representation of the interaction effect of age and woody breast (WB) severity on M1 of broiler carcasses.
Figure 9B:
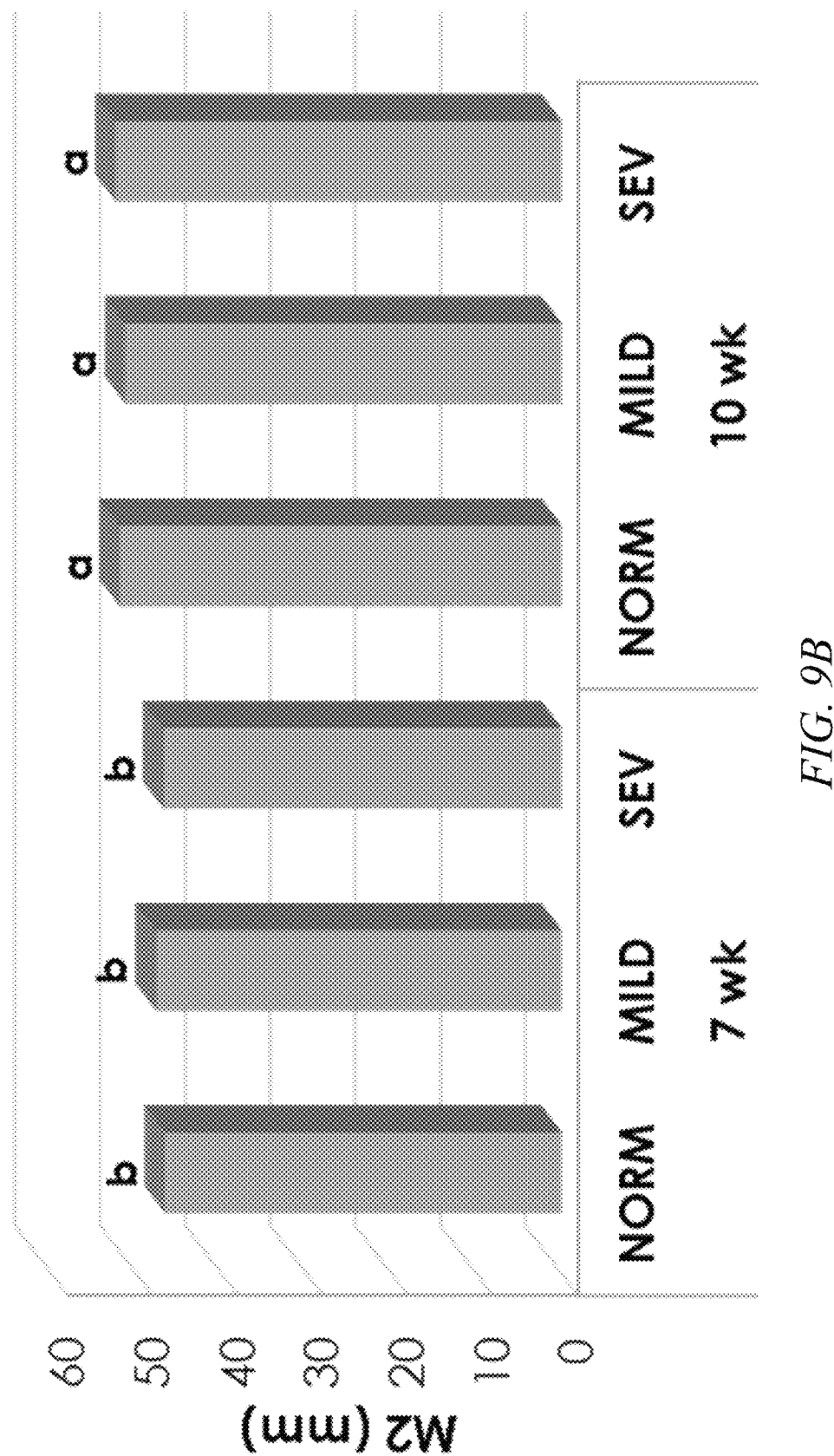
FIG. 9B is a graphical representation of the interaction effect of age and woody breast (WB) severity on M2 of broiler carcasses.
Figure 9C:
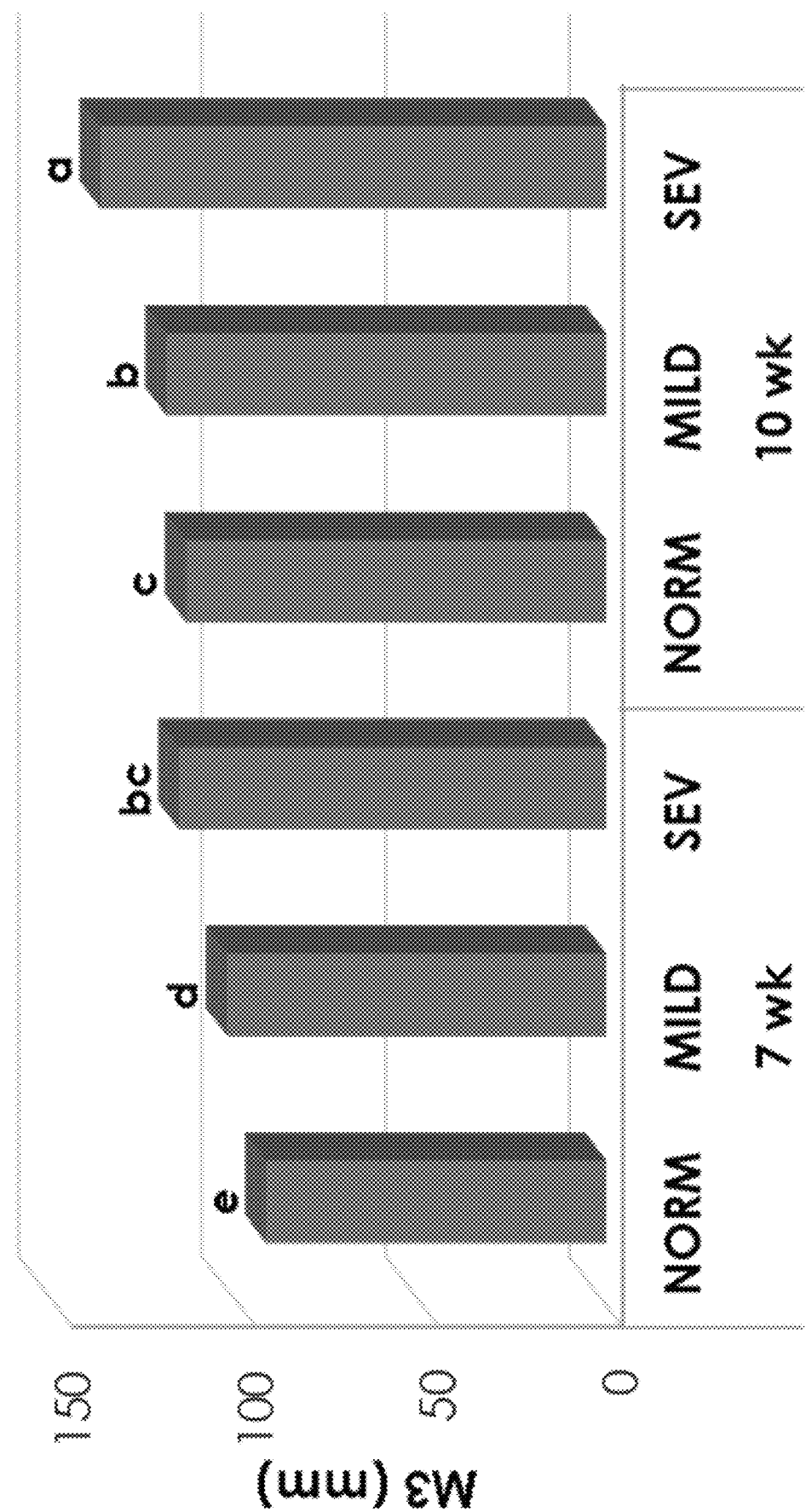
FIG. 9C is a graphical representation of the interaction effect of age and woody breast (WB) severity on M3 of broiler carcasses.
Figure 9D:
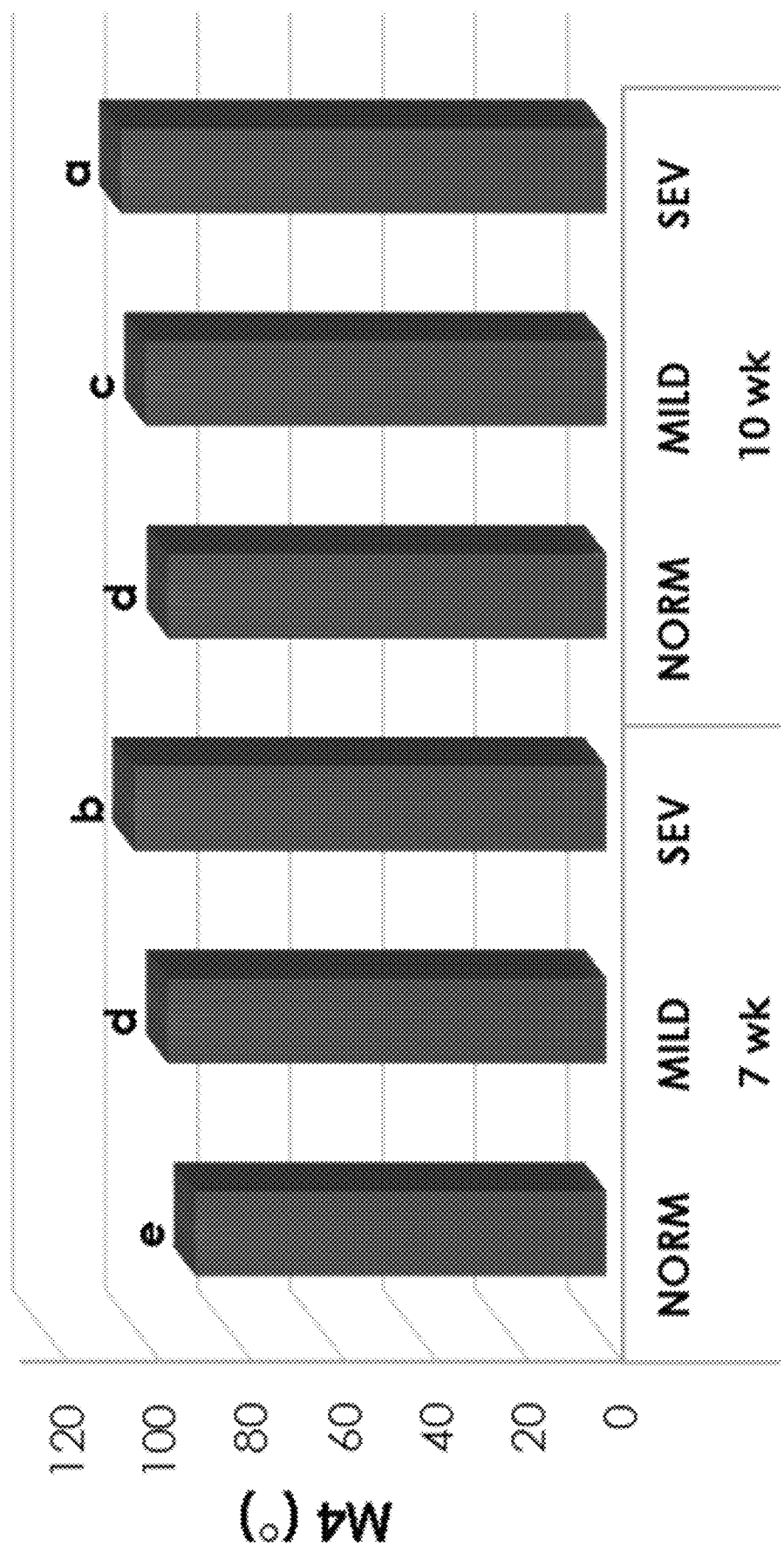
FIG. 9D is a graphical representation of the interaction effect of age and woody breast (WB) severity on M4 of broiler carcasses.
Figure 9E:
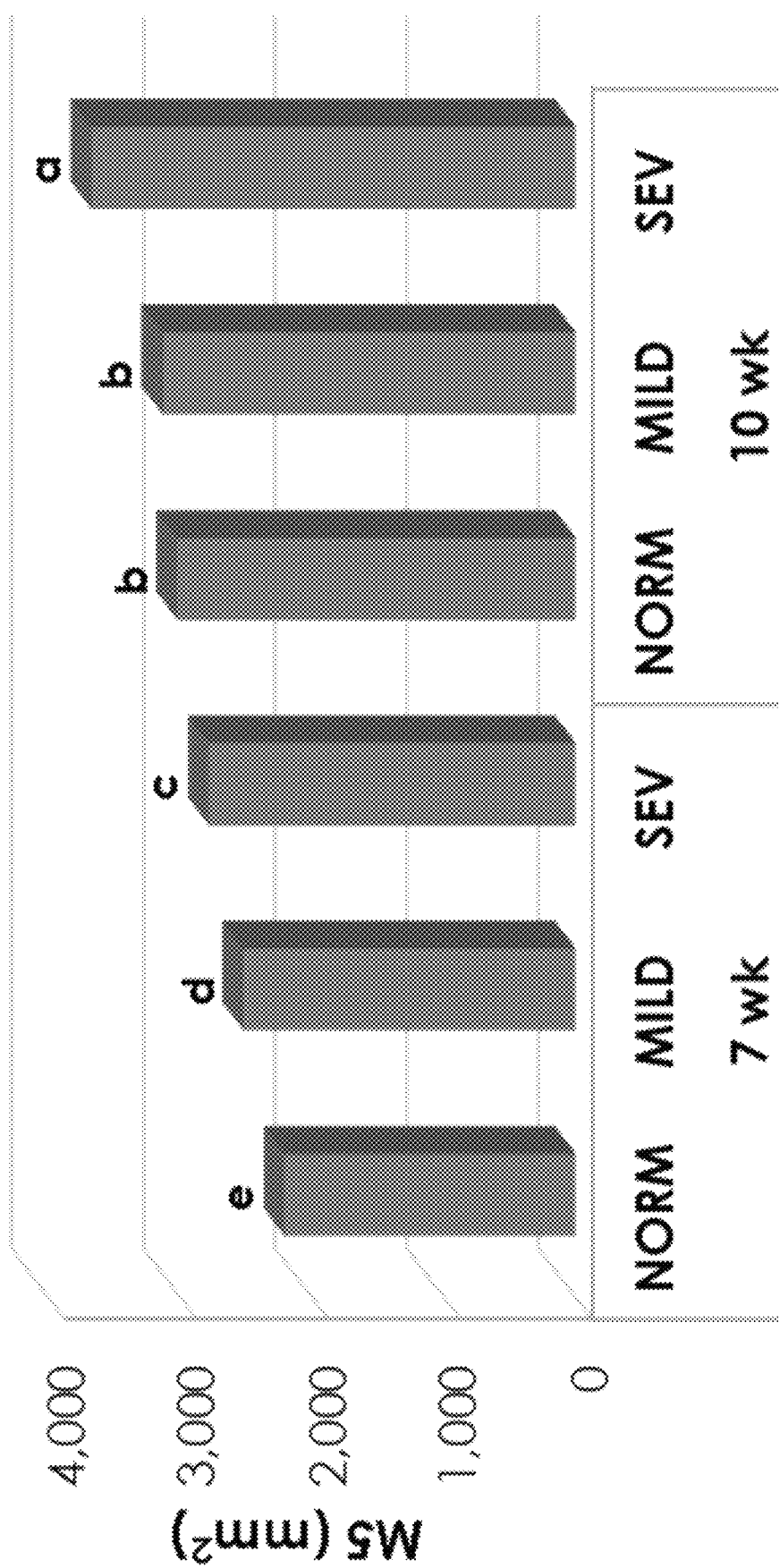
FIG. 9E is a graphical representation of the interaction effect of age and woody breast (WB) severity on M5 of broiler carcasses.
Figure 9F:
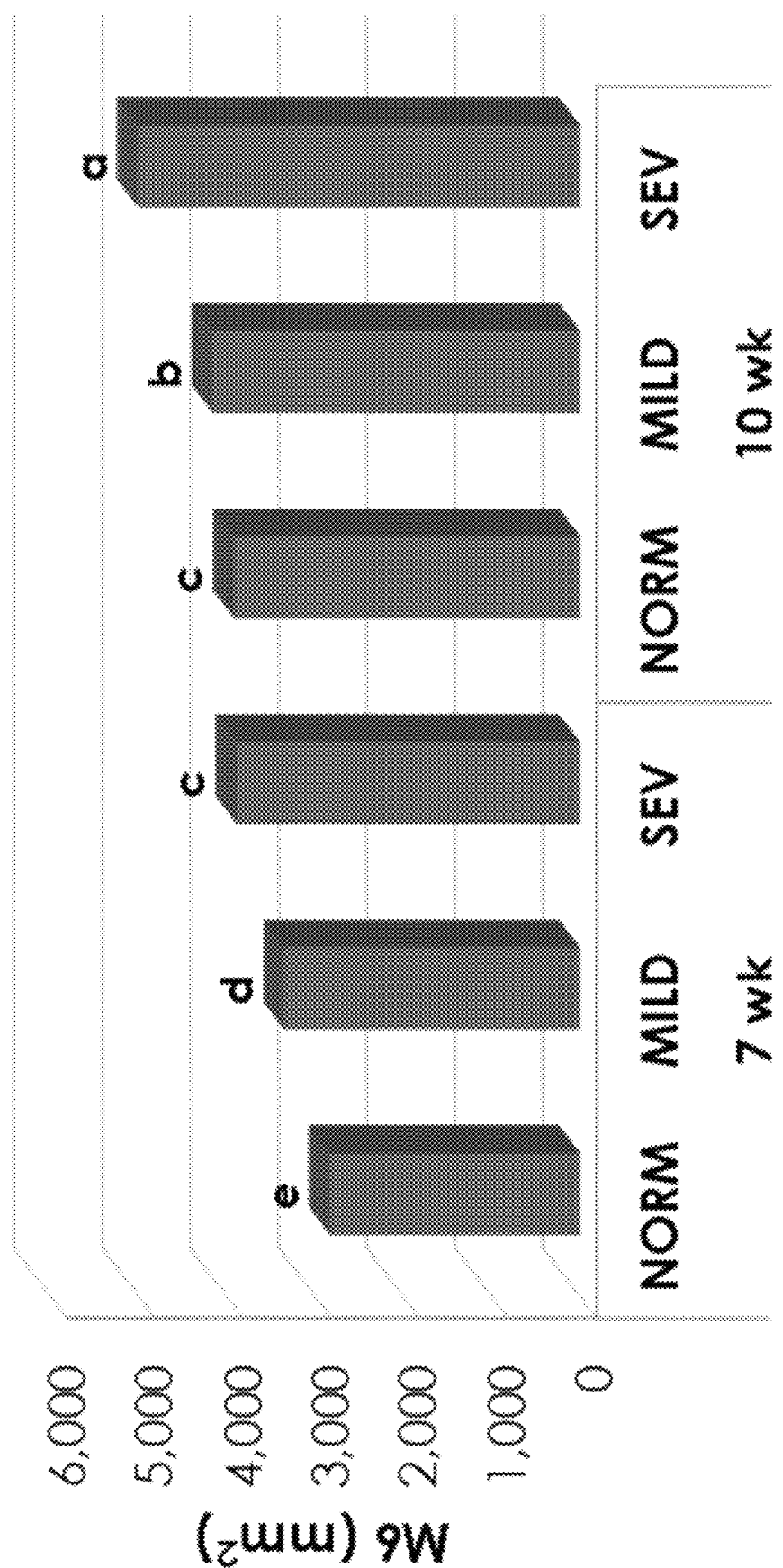
FIG. 9F is a graphical representation of the interaction effect of age and woody breast (WB) severity on M6 of broiler carcasses.

Model Using Carcass Measurements:

Image measurements of M1 through M7 and carcass weight, without giblets (WOG), were initially used for model develop, and M1, M4, M6 and M7 were significant (P<0.05) and therefore chosen for model parameters (Table 5). From the total number of images, 842 were used for model development (training; generalized $R^2$ 0.5891) and 361 for validation (generalized $R^2$ 0.6039). These measurements were used to predict three categories of WB: Normal (score 0-0.5), Mild (score 1-1.5), and Severe (score 2-3). FIG. 8 shows the sensitivity (true positive) rates for both mild (0.88, good) and severe (0.92, excellent) categories of WB.

TABLE 5

Parameter estimates for Ordinal Logistic Model based on four carcass measurements for predicting three levels of woody breast.

| Term | Estimate | Std Error | ChiSquare | Prob > ChiSq |
|---|---|---|---|---|
| Intercept [NOR] | 41.4345204 | 2.7980342 | 219.29 | <.0001* |
| Intercept [MIL] | 43.9291783 | 2.8570817 | 236.41 | <.0001* |
| M1 | −0.0760441 | 0.0129945 | 34.25 | <.0001* |
| M4 | −0.3625174 | 0.0240556 | 227.11 | <.0001* |
| M6 | 0.0027432 | 0.0004283 | 41.02 | <.0001* |
| M7 | −0.0041144 | 0.0006483 | 40.28 | <.0001* |

The overall misclassification rate for the model was 32.6%; however, this included both categories and when evaluating misclassifications for each category, the rate is lower. For example, in the training model, less than 1% of normal fillets would have been misclassified as severe fillets whereas approximately 22% of normal would be misclassified as mild (Table 6, Training). For the severe category, there would be less than 2% misclassified into the normal and 31% into the mild category. Therefore, the misclassification rate is actually low for predicting normal and severe categories. The mild fillets were misclassified most often (~46%) into either the normal or severe categories. This could be expected as these fillets are intermediate in many shape features along with meat quality attributes when compared to the other categories. When validating the model, the results sensitivity was similar (Table 6, Validation). The profiler shown in FIG. 9 provides a visual relationship between the factors and their prediction values. For example, the figure was set to a high M4 (angle at keel tip) and shows a high probability (P=0.936) of woody breast occurrence (mild or severe).

TABLE 6

Classification of fillets into WB categories; false positives.

| Actual | Predicted Count | | |
|---|---|---|---|
| WB_3 | NOR | MIL | SEV |
| Training | | | |
| NOR | 283 | 80 | 3 |
| MIL | 78 | 141 | 43 |
| SEV | 4 | 67 | 143 |
| Validation | | | |
| NOR | 122 | 38 | 4 |
| MIL | 27 | 49 | 24 |
| SEV | 3 | 30 | 64 |

Model Using Ratios of Carcass Measurements:

Ratios between certain carcass features were calculated: M8, M9 and M10. Measurements M8 (width of caudal region to width of cranial region) and M9 (width at caudal region to 20% fillet length, M5, ratio) were chosen for model based on P values. From the total number of images, 828 were used for model development (training; generalized $R^2$ 0.5729) and 375 for validation (generalized $R^2$ 0.5879). These measurements were used to predict three categories of WB. The sensitivity (true positive) rates for both mild (0.89, good) and severe (0.90, excellent) categories of WB were similar to the previous model using carcass measurements. The overall misclassification rate was also similar to the previous model at 33.7%. However, the percent of misclassified severe fillets into a normal category was higher at approximately 6% in the training model (Table 7).

TABLE 7

Classification of fillets into WB categories; false positives.

| Actual | Predicted Count | | |
|---|---|---|---|
| WB_3 | NOR | MIL | SEV |
| Training | | | |
| NOR | 299 | 61 | 8 |
| MIL | 83 | 116 | 51 |
| SEV | 13 | 63 | 134 |
| Validation | | | |
| NOR | 128 | 28 | 6 |
| MIL | 46 | 50 | 16 |
| SEV | 3 | 26 | 72 |

Statistical Analysis:

In Experiment 1, a subset of data (n=180) was used to determine if there are conformation changes that can be used to identify broiler carcasses with WB characteristics from two commercial high breast yielding strains at 7 and 10 wk using the image analysis. In this study, 15 replications (carcass) per treatment were used. ANOVA of broiler carcass dimensions across WB categories was also conducted and means were separated using Tukey's HSD at a significance of P<0.05 using JMP (SAS Institute Inc., Cary, N.C.).

In Experiment 2, another subset of data (n=156) was used to evaluate the relationships of broiler (8 wk) carcass conformation, palpation scores and instrumental compression force. Correlation coefficients were estimated for WB severity scores, compression force and image measurements. ANOVA of broiler carcass dimensions across WB categories was also conducted and means were separated using Tukey's HSD at a significance of P<0.05.

In Experiment 3, all carcass image data (n=1203) were used to develop predictive models using Ordinal Logistic analysis. Models were based on 3 categories of WB (Normal, Mild, and Moderate/Severe), and additionally, models were developed based on 2 categories with a score of 2 and above as a threshold of WB presence or absence. Correlation coefficients were also estimated between WB score and the carcass measurements along with carcass without giblet (WOG) weight.

Figure 10A:
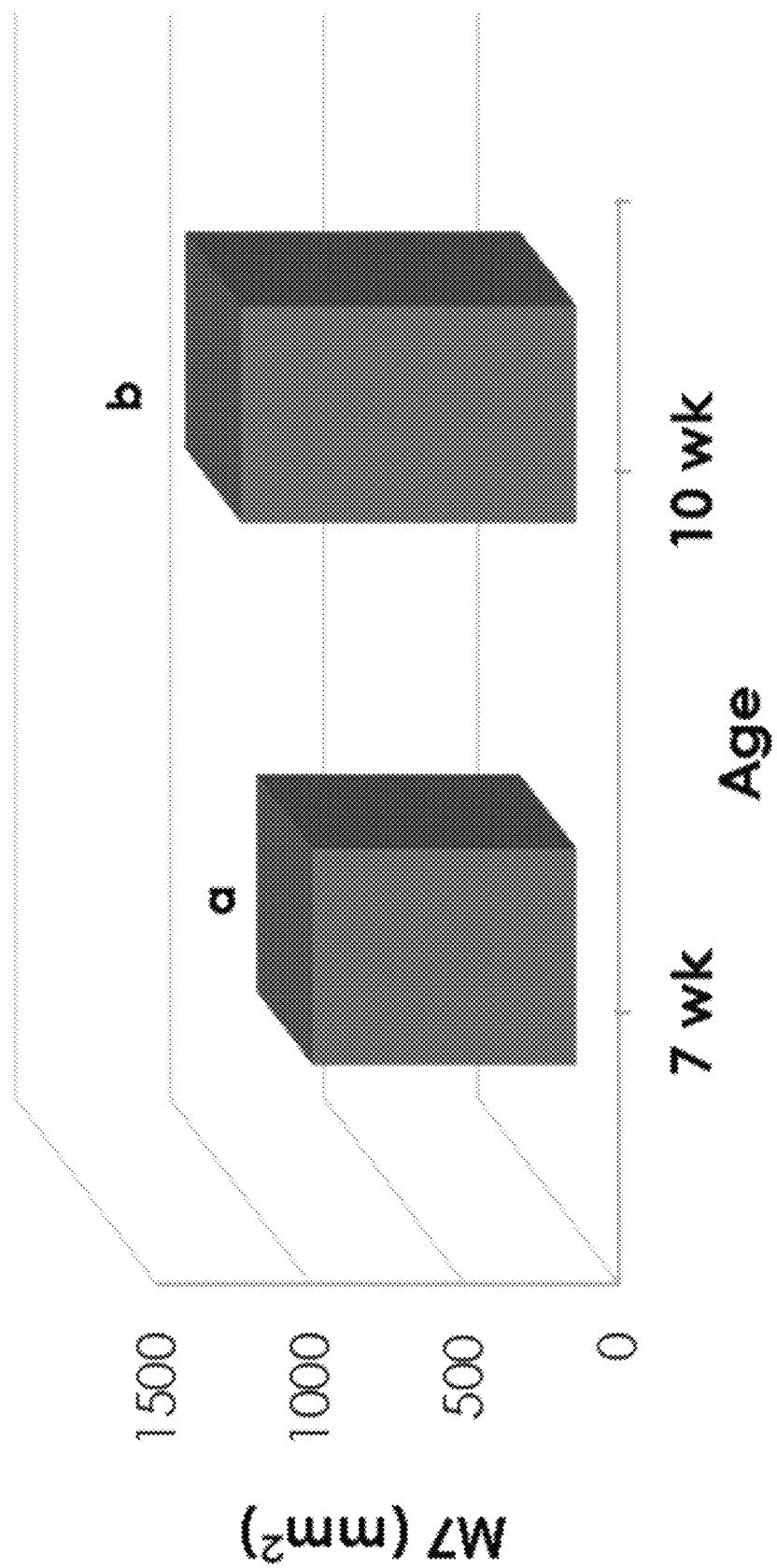
FIG. 10A is a graphical representation of the effect of age on M7 (M6−M5) of broiler carcasses.
Figure 10B:
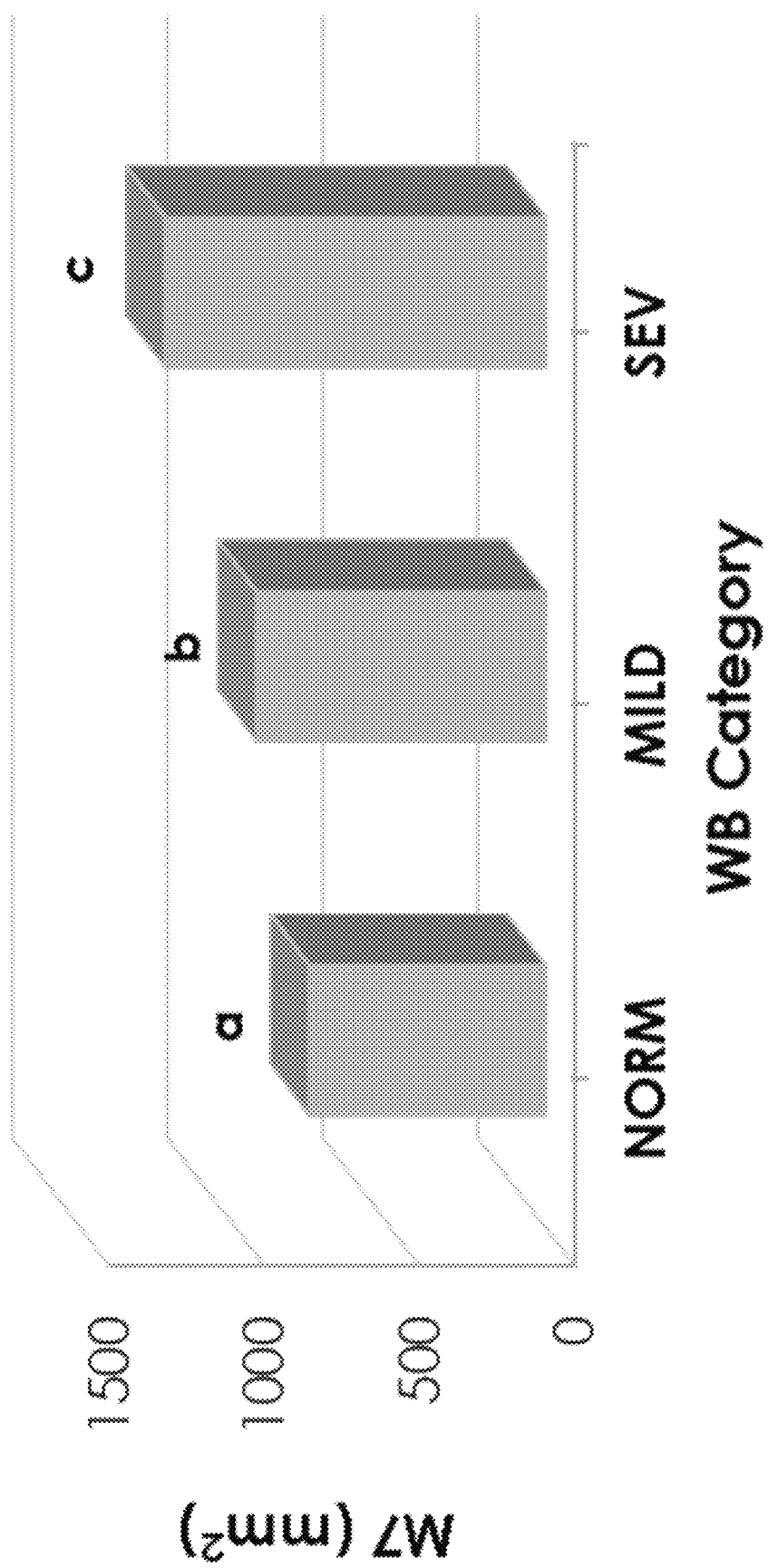
FIG. 10B is a graphical representation of the effect of woody breast (WB) severity on M7 (M6−M5) of broiler carcasses.

As illustrated in FIGS. 9 through 11, the interaction of age and woody breast was significant (P<0.05) for most measurements and strain was significant (P<0.05) for M2 through M4 and M7. With exception to M2, measurements increased (P<0.05) as woody breast severity increased. M3 through M7 were highly correlated with woody breast score within strain and age (r=0.78 to 0.95, P<0.01). The M3 (caudal width) had the highest correlation to woody breast severity regardless of strain and age (r=0.92 to 0.95, P<0.01), while M4 (angle at keel) and M6 also had high correlations to woody breast severity with some impact of age (r=0.91 to 0.94, P<0.01, at 7 wk and r=0.85 to 0.87, P<0.01, at 10 wk). Automation of these measurements would allow for the potential integration into current on-line vision grading systems, and allow poultry processing plants to identify and sort broiler carcasses by woody breast condition.

As noted above, the inventive method can be utilized by an automated, real-time vision grading system in conjunction with an on-line process control in a poultry processing plant. The vision grading system can include a high-speed digital camera, LED lighting and advanced recognition software for evaluate size, shape, color and/or texture of broiler chickens. The vision grading system stores the digital images received from the camera to a computer and then processes the digital images in accordance the method described above.

The system and method described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The systems and/or methods described herein, and steps thereof, may be realized in hardware, software or any combination of hardware and software suitable for a particular application. The hardware may include a general-purpose computer and/or dedicated computing device or specific computing device or particular aspect or component of a specific computing device. The methods may be realized in one or more microprocessors, microcontrollers, embedded microcontrollers, programmable digital signal processors or other programmable device, along with internal and/or external memory. The methods may also, or instead, be embodied in an application specific integrated circuit, a programmable gate array, programmable array logic, or any other device or combination of devices that may be configured to process electronic signals. It will further be appreciated that one or more of the methods may be realized as a computer executable code capable of being executed on a machine-readable medium.

The computer executable code may be created using a structured programming language such as C, an object oriented programming language such as .NET and C++, a lightweight data-interchange programming language such as JavaScript Object Notation (JSON) data-interchange format over HTTP POST request/response, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the methods described above may include any of the hardware and/or software described above. All such permutations and combinations are intended to fall within the scope of the present disclosure.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the disclosure may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the disclosure, the term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)–(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Still further, additional aspects of the invention may be found in one or more appendices attached hereto and/or filed herewith, the disclosures of which are incorporated herein by reference as if fully set out at this point.

Thus, the present invention is well adapted to carry out the objects and attain the ends and advantages mentioned above as well as those inherent therein. While the inventive concept has been described and illustrated herein by reference to certain illustrative embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A method of detecting woody breast condition in a broiler carcass using image analysis, said method comprising the steps of:
    acquiring a digital image of said broiler carcass;
    detecting, by a processor, a presence of woody breast condition in said broiler carcass using automated image analysis of at least one carcass feature of said image of said broiler carcass;
    computing at least one measurement of a caudal region of said broiler carcass;
    computing a breast width of a cranial region of said carcass, wherein said breast width is M1;
    computing a length from a tip of a keel bone of said broiler carcass to about ⅕th of a total breast length of said broiler carcass, wherein said length is M2; and
    automatically grading or categorizing a severity of any detected presence of said woody breast condition in said broiler carcass.

2. The method of claim 1 wherein said step of acquiring said digital image of said broiler carcass further comprises the step of acquiring said digital image of said broiler carcass against a background having a sharp outline of said broiler carcass.

3. The method of claim 1 further comprising the step of detecting woody breast condition in said broiler carcass using non-destructive and non-contact image analysis of said carcass feature.

4. The method of claim 3 further comprising the step of detecting woody breast condition in said broiler carcass using said non-destructive and non-contact image analysis of said carcass feature controlled by an on-line process control system.

5. The method of claim 1 further comprising the step of grading or categorizing said severity as mild, moderate or severe.

6. The method of claim 5 further comprising the step of grading or categorizing said severity of said woody breast condition in said broiler carcass using an automated, real-time vision grading system.

7. The method of claim 1 further comprising the step of computing a breast width at an end of M2, wherein said breast width at said end of M2 is M3.

8. The method of claim 7 further comprising the step of computing an angle formed at a tip of a keel bone of said broiler carcass, wherein said angle is M4.

9. The method of claim 8 further comprising the step of computing an area of a triangle formed by M3 and M4, wherein said angle M4 extends to end points of M3, and wherein said area of said triangle is M5.

10. The method of claim 7 further comprising the step of computing an area of said caudal region formed above M3, wherein said area of said caudal region formed above M3 is M6.

11. The method of claim 10 further comprising the step of computing a difference of said area M6 and said area M5, wherein said difference is M7.

12. The method of claim 7 further comprising the step of computing a ratio of M3 to M1, wherein said ratio of M3 to M1 is M8.

13. The method of claim 7 further comprising the step of computing a ratio of M3 to M2, wherein said ratio of M3 to M2 is M9.

14. The method of claim 11 further comprising the step of computing a ratio of M7 to M5, wherein said ratio of M7 to M5 is M10.

15. A method for automated vision grading of woody breast condition in a broiler carcass, said method comprising the steps of:
    electronically processing by a processor of a digital image of a broiler carcass to compute at least one measurement of a caudal region of said broiler carcass;
    electronically computing a breast width of a cranial region of said carcass, wherein said breast width is M1;
    electronically computing a length from a tip of a keel bone of said broiler carcass to about 1/5th of a total breast length of said broiler carcass, wherein said length is M2;
    based on said measurement of said caudal region of said broiler carcass, electronically detecting a presence of woody breast condition in said broiler carcass using non-destructive and non-contact image analysis of said digital image; and for any detected presence of said woody breast condition, automatically grading or categorizing a severity of said woody breast condition in said broiler carcass.

16. The method of claim 15 wherein said at least one measurement of said caudal region of said broiler carcass comprises: a breast width at an end of M2, wherein said breast width at said end of M2 is M3; an angle formed at a tip of a keel bone of said broiler carcass, wherein said angle is M4; an area of a triangle formed by M3 and M4, wherein said angle M4 extends to end points of M3, and wherein said area of said triangle is M5; an area of said caudal region formed above M3, wherein said area of said caudal region formed above M3 is M6; a difference of said area M6 and said area M5, wherein said difference is M7; a ratio of M3 to M1, wherein said ratio of M3 to M1 is M8; a ratio of M7 to M5, wherein said ratio of M7 to M5 is M10; a ratio of M3 to M2, wherein said ratio of M3 to M2 is M9; or a combination thereof.

17. The method of claim 15 further comprising the step of acquiring said digital image of said broiler carcass against a background having a sharp outline of said broiler carcass.

18. The method of claim 15 wherein said step of detecting said presence of woody breast condition in said broiler carcass further comprises the step of using non-destructive and non-contact image analysis of said broiler carcass controlled by an on-line process control system.

19. The method of claim 15 further comprising the step of electronically grading or categorizing said severity as mild, moderate or severe.

\* \* \* \* \*

UNITED STATES PATENT AND TRADEMARK OFFICE
CERTIFICATE OF CORRECTION

PATENT NO. : 10,806,153 B2  
APPLICATION NO. : 16/012908  
DATED : October 20, 2020  
INVENTOR(S) : Casey Owens Hanning et al.

Page 1 of 1

It is certified that error appears in the above-identified patent and that said Letters Patent is hereby corrected as shown below:

On the Title Page

Item (72), Column 1, Lines 3-4 amend "Andronikos Mauromostakos" to --Andronikos Mauromoustakos--

Signed and Sealed this  
Fifteenth Day of June, 2021

Drew Hirshfeld  
*Performing the Functions and Duties of the  
Under Secretary of Commerce for Intellectual Property and  
Director of the United States Patent and Trademark Office*